United States Patent
Kalman et al.

(10) Patent No.: US 6,446,672 B1
(45) Date of Patent: Sep. 10, 2002

(54) FLEXIBLE PIPE INCLUDING VENT PASSAGE AND METHOD OF MANUFACTURING SAME

(75) Inventors: Mark D. Kalman; Dana J. Fraser, both of Panama City, FL (US)

(73) Assignee: Wellstream, Inc., Panama City, FL (US)

( * ) Notice: Subject to any disclaimer, the term of this patent is extended or adjusted under 35 U.S.C. 154(b) by 0 days.

(21) Appl. No.: 09/705,309

(22) Filed: Nov. 3, 2000

Related U.S. Application Data

(60) Provisional application No. 60/163,908, filed on Nov. 5, 1999.

(51) Int. Cl.[7] .............................................. F16L 11/10
(52) U.S. Cl. ...................... 138/127; 138/135; 138/130; 138/104; 138/144
(58) Field of Search ................................. 138/124, 125, 138/126, 127, 130, 135, 144, 104, 121

(56) References Cited

U.S. PATENT DOCUMENTS

| | | |
|---|---|---|
| 3,441,057 A | 4/1969 | Clement et al. |
| 3,585,540 A | 6/1971 | Schuttloffel et al. |
| 3,860,040 A | 1/1975 | Sullivan |
| 4,285,534 A | 8/1981 | Katayama et al. |
| 4,402,346 A | 9/1983 | Cheetham et al. |
| 4,492,089 A | 1/1985 | Rohrer et al. |
| 4,700,751 A | 10/1987 | Fedrick |
| 4,756,339 A | 7/1988 | Buluschek |
| 5,174,685 A | 12/1992 | Buchanan |
| 5,275,209 A | 1/1994 | Sugier et al. |
| 5,314,210 A | 5/1994 | Calmettes et al. |
| 5,667,008 A | 9/1997 | Moore |
| 5,676,175 A | 10/1997 | Bar et al. |
| 5,782,506 A | 7/1998 | Uematsu et al. |
| 5,890,960 A | 4/1999 | Cronan et al. |
| 5,918,641 A | 7/1999 | Hardy et al. |
| 5,921,285 A | 7/1999 | Quigley et al. |
| 5,934,332 A | 8/1999 | Rodriquez et al. |
| 6,004,639 A | 12/1999 | Quigley et al. |
| 6,016,845 A | 1/2000 | Quigley et al. |
| 6,016,848 A | 6/2000 | Egres, Jr. |

OTHER PUBLICATIONS

International Searching Authority, Patent Cooperation Treaty, Notification of Transmittal of The International Search Report or the Declaration, International Application No. PCT/US00/30513, Apr. 2, 2001, 5 pages.

*Primary Examiner*—James Hook
(74) *Attorney, Agent, or Firm*—Haynes and Boone, LLP.

(57) ABSTRACT

A flexible pipe formed by multiple layers of different materials, one of which has a vent passage.

34 Claims, 1 Drawing Sheet

FLEXIBLE PIPE INCLUDING VENT PASSAGE AND METHOD OF MANUFACTURING SAME

This application claims priority of provisional application Ser. No. 60/163,908 filed Nov. 5, 1999.

This invention relates to a flexible pipe according to which the pipe is formed by multiple layers of different materials, one of which has a vent passage.

DETAILED DESCRIPTION

Figure 1:
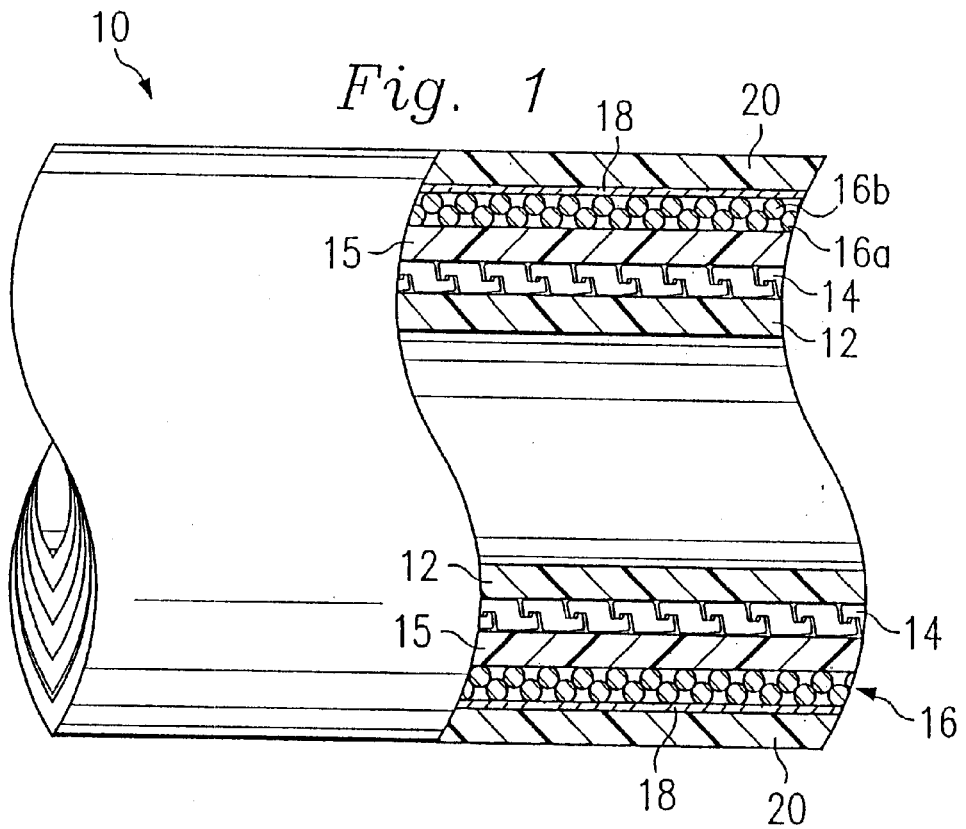
FIG. 1 is a longitudinal sectional view of a flexible pipe according to an embodiment of the present invention.
Figure 2:
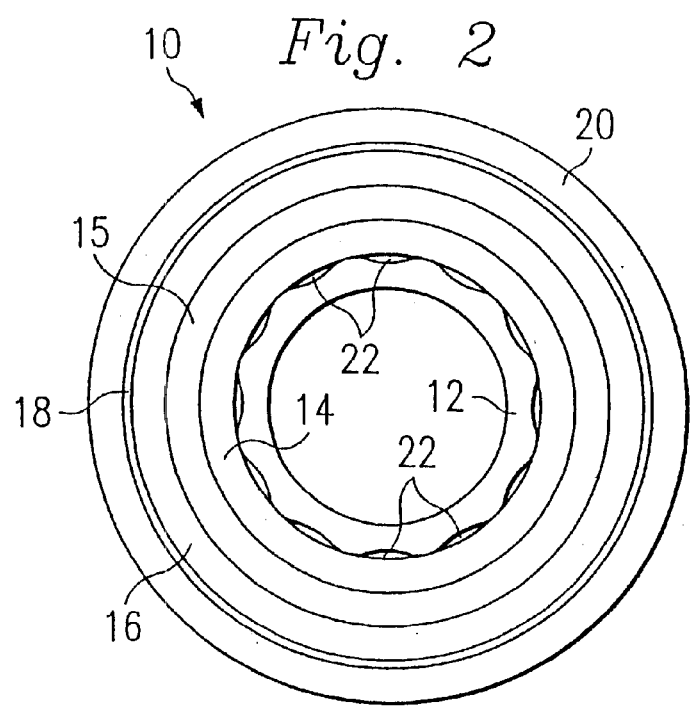
FIG. 2 is an end view of the pipe of FIG. 1.

With reference to FIG. 1, a flexible pipe according to an embodiment of the present invention is shown, in general by the reference numeral 10. The pipe 10 is formed by an inner layer 12, preferably in the form of an extruded plastic sheath, for conveying fluid through its bore. As shown in FIG. 2, the outer surface of the layer 12 is undulated thus forming a series of ridges and valleys for reasons to be described. The layer 12 may be formed in a conventional manner using polymers, or the like.

A layer 14 extends around the layer 12 and provides resistance to internal pressure, hydrostatic collapse and crush. The layer 14 is formed by helically wrapping a continuous metal strip, preferably formed of carbon steel, with adjacent windings being interlocked, to form a flexible layer that provides significant hoop and axial strength. The layer 14 is marketed by the assignee of the present invention, Welistream, Inc., under the "Flexlok" trademark. Alternatively, the layer 14 can be of the types disclosed in application Ser. No. 09/706,070 (attorney's docket no. 27644.03.02) filed concurrently herewith and assigned to the assignee of this application; with the disclosure of the former application being incorporated by reference.

A seal layer 15, preferably in the form of an extruded plastic sheath, is provided over the layer 14 to increase the resistance to hydrastatic compression, and assist in limiting the moisture that permeates from the bores of the layer 12.

A layer 16 of wrapped wires extends over the layer 15 and consists of a series of wires 16a helically wrapped around the exterior of the layer 15 to form a first tensile layer, and an additional series of wires 16b wrapped around the first series of wires 16a to form a second tensile layer extending over the first tensile layer. The wires 16a and 16b have a circular cross section, and are wound at a relatively high lay angle to provide significant hoop strength and axial strength. Preferably, at least a portion of the wires 16a and 16b are formed by carbon steel with a plastic or anodic coating. It is noted that the layers 14 and 15 prevent the expansion of the layer 12 into gaps formed between the wires of the tensile layers 16a and 16b.

A layer 18 is formed by helically wrapping tape over the layer 16. The tape forming the layer 18 can be plastic or metal and can be reinforced with glass, metal or a different type of plastic. Although not shown in the drawings, it is understood that the tape layer 18 can also extend between the layer 14 and the layer 16, and between the series of wires 16a and 16b.

A protective outer layer 20, in the form of an insulative sheath, extends over the tape layer 18 and is preferably in the form of an extruded plastic sheath that extends over the tape layer in a conventional manner, with the tape providing a smooth surface for the extrusion. The layer 20 is optional and is required only when the tape layer is inadequate to protect the remaining components of the pipe 10.

In operation, when the pipe 10 is put into service the ridges formed by the undulating outer surface of the layer 12, and the corresponding inner surface of the layer 14, form passages 22 for venting any gases that might permeate through the layer 12. These passages extend for the length of the pipe 10 and can discharge into atmosphere at one of the ends of the pipe.

VARIATIONS

1. Additional tensile layers of wires can be provided in addition to the series of wires 16a and 16b.

2. The vent passages can be formed by longitudinal strips extending over the outer surface of the layer 12.

3. A plurality of longitudinal tubes could be imbedded in one or more of the layers 12, 14, 15, 16, 18, and 30 to provide the vent passages.

4. Rather than providing the sheath 12 with an undulating outer surface, longitudinal grooves or slots can be provided in the outer surface to form the vent passages.

5. The seal layer 15 can extend over the layer 16 or between the tensile layers formed by the wires 16a and 16b, in which case the venting would be between the adjacent wires 16a.

6. The adjacent windings of the strip forming the layer 14 do not have to be interlocked.

7. The cross section of the wires 16a and 16b can be rectangular as disclosed in the above cited application.

8. In extremely hostile environments, an outer layer similar to the layer 14 can be placed around the sheath 20 for added protection.

It is understood that spatial references, such as "under", "over", "between", "outer", "inner" and "surrounding" are for the purpose of illustration only and do not limit the specific orientation or location of the layers described above.

Since other modifications, changes, and substitutions are intended in the foregoing disclosure, it is appropriate that the appended claims be construed broadly and in a manner consistent with the scope of the invention.

What is claimed is:

1. A flexible pipe, comprising:
    an inner tubular member defining an inner longitudinal passage and having an undulating outer surface so that the diameter of the tubular member alternately increases and decreases in an axial direction; and
    a metal strip helically wound over the tubular member to form a plurality of vent passages between the decreased diameter portions of the tubular member and the inner surface of the strip, the vent passages venting to an end of the tubular member any fluids that may permeate through the tubular member.

2. The pipe of claim 1 further comprising a seal layer, in the form of an extruded plastic sheath, extending over the metal strip.

3. The pipe of claim 2 further comprising at least one layer of wires wrapped helically around the seal layer.

4. The pipe of claim 3 wherein there are two layers of wires.

5. The pipe of claim 3 wherein the wires of one layer of wires are wrapped in an opposite direction to the wires of the other layer of wires.

6. The pipe of claim 3 wherein a plurality of vent passages are formed between adjacent wires of each layer of wires.

7. The pipe of claim 3 further comprising at least one layer of tape extending over at least one layer of wires.

8. The pipe of claim 7 further comprising an insulative layer, in the form of an extruded plastic sheath, extending over the layer of tape.

9. The pipe of claim 1 further comprising at least one layer of wires wrapped helically around the metal strip.

10. The pipe of claims 9 wherein there are two layers of wires.

11. The pipe of claim 9 wherein a plurality of vent passages are formed between adjacent wires of each layer of wires.

12. The pipe of claim 9 further comprising a seal layer extending over at least one layer of wires.

13. The pipe of claims 12 further comprising an additional layer of wires wrapped helically around the seal layer.

14. The pipe of claim 13 wherein the wires of one of the layers of wires are wrapped in an opposite direction to the wires of the other layer of wires.

15. The pipe of claim 13 further comprising a seal layer, in the form of an extruded plastic sheath, extending over the additional layer of wires.

16. The pipe of claim 12 or 15 further comprising at least one layer of tape extending over the seal layer.

17. The pipe of claim 16 further comprising an insulative layer, in the form of an extruded plastic sheath, extending over the layer of tape.

18. A method of manufacturing a flexible pipe, comprising:

forming an undulating outer surface on an inner tubular member so that the diameter of the tubular member alternately increases and decreases in an axial direction; and winding a metal strip over the tubular member to form a layer around the outer surface of the tubular member and define a plurality of vent passages between the decreased diameter portions of the tubular member and the inner surface of the layer, so that any fluids that may permeate through the tubular member are venting through the vent passages to an end of the tubular member, 19. The method of claim 18 further comprising providing a seal layer, in the form of an extruded plastic sheath, over the metal strip.

20. The method of claim 19 further comprising wrapping at least one layer of wires around the seal layer.

21. The method of claim 20 wherein a plurality of vent passages are formed between adjacent wires of each layer of wires.

22. The method of claim 20 wherein there are two layers of wires.

23. The method of claim 20 wherein the wires of one of the layers of wires are wrapped in an opposite direction to the wires of the other layer of wires.

24. The method of claim 20 further comprising wrapping at least one layer of tape over at least one layer of wires.

25. The method of claim 24 further comprising providing an insulative layer, in the form of an extruded plastic sheath, over the layer of tape.

26. The method of claim 18 further comprising wrapping at least one layer of wires around the metal strip, 27. The method of claims 26 wherein there are two layers of wires.

28. The method of claim 27 wherein the wires of one of the layers of wires are wrapped in an opposite direction to the wires of the other layer of wires.

29. The method of claim 27 wherein a plurality of vent passages are formed between adjacent wires of each layer of wires.

30. The method of claim 29 further comprising providing a seal layer, in the form of an extruded plastic sheath, extending over the additional layer of wires.

31. The method of claim 29 further comprising wrapping at least one layer of tape extending over the seal layer.

32. The method of claim 31 further comprising providing an insulative layer, in the form of an extruded plastic sheath, over the layer of tape.

33. The method of claim 26 further comprising providing a seal layer over the at least one layer of wires.

34. The method of claim 33 further comprising wrapping an additional layer of wires around the seal layer.

* * * * *